United States Patent [19]
Woods

[11] Patent Number: 4,587,786
[45] Date of Patent: May 13, 1986

[54] SCAFFOLDING AND LOCKING DISCS THEREFOR
[75] Inventor: Neil W. Woods, Mississauga, Canada
[73] Assignee: Anthes Equipment Limited, Mississauga, Canada
[21] Appl. No.: 653,508
[22] Filed: Sep. 21, 1984
[30] Foreign Application Priority Data
Oct. 26, 1983 [CA] Canada .................................. 439784
[51] Int. Cl.⁴ ............................................ E04H 12/00
[52] U.S. Cl. ........................................ 52/638; 403/49; 403/246; 182/179
[58] Field of Search ..................... 52/638; 403/49, 256, 403/246; 182/179

[56]  References Cited
U.S. PATENT DOCUMENTS

| 1,460,928 | 7/1923 | Tilden | 403/247 |
| 2,303,428 | 12/1942 | Black | 52/645 |
| 3,420,557 | 1/1969 | Francis et al. | 182/179 X |
| 3,817,641 | 6/1974 | Steele et al. | 403/256 |
| 4,044,523 | 8/1977 | Layher | 52/638 |
| 4,083,640 | 4/1978 | Lovering | 403/49 X |
| 4,095,910 | 6/1978 | Steele et al. | 403/49 |
| 4,180,342 | 12/1979 | Layher | 403/49 X |
| 4,273,463 | 6/1981 | Dobersch | 182/179 X |
| 4,394,095 | 7/1983 | Layher | 403/49 |
| 4,493,578 | 1/1985 | D'Alessio | 403/49 |
| 4,525,096 | 6/1985 | Green et al. | 403/49 |

FOREIGN PATENT DOCUMENTS
435761 9/1935 United Kingdom .

OTHER PUBLICATIONS
Layher Allround Scaffolding.
Layher Scaffolding for Shipbuilding and Offshore.
Anthes Allround Scaffolding.

Primary Examiner—Alfred C. Perham
Assistant Examiner—Jean M. LaKemper
Attorney, Agent, or Firm—Anthony J. Casella; Gerald E. Hespos

[57] ABSTRACT

The disclosure relates to scaffolding and includes the use of apertured locking discs adapted to cooperate with vertical supports, and horizontal or diagonal brace members. The ends of the brace members are provided with pivotable locking wedges which can be driven down through said ends and through the apertures in the locking discs. The apertures are all identically shaped and depending upon the intended purpose of the scaffold, certain surfaces of the ends of the brace members and the cooperating apertures are contacted by the locking wedges which thereby determines in which direction the horizontal members will extend.

8 Claims, 10 Drawing Figures

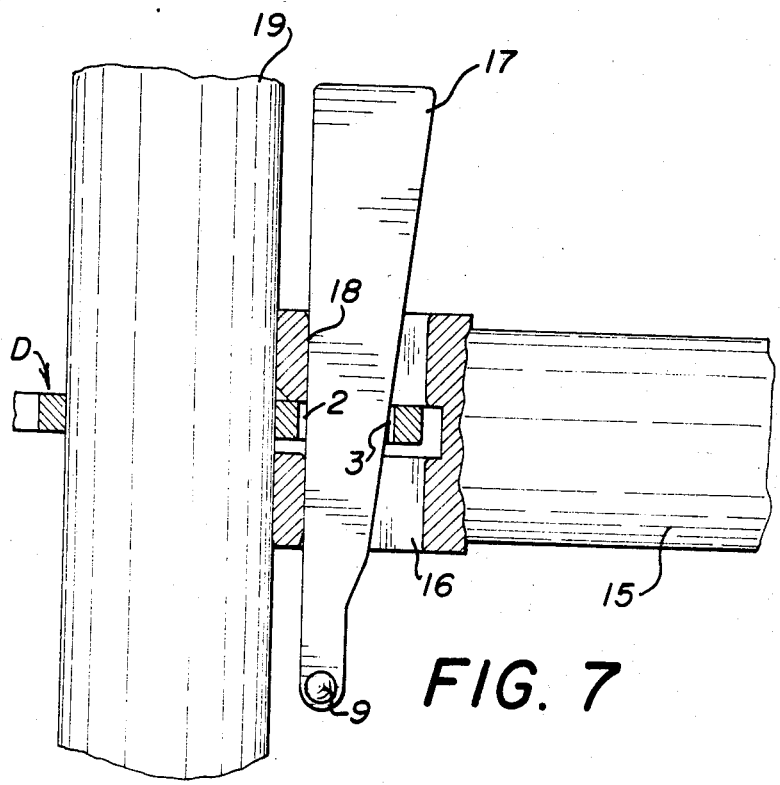
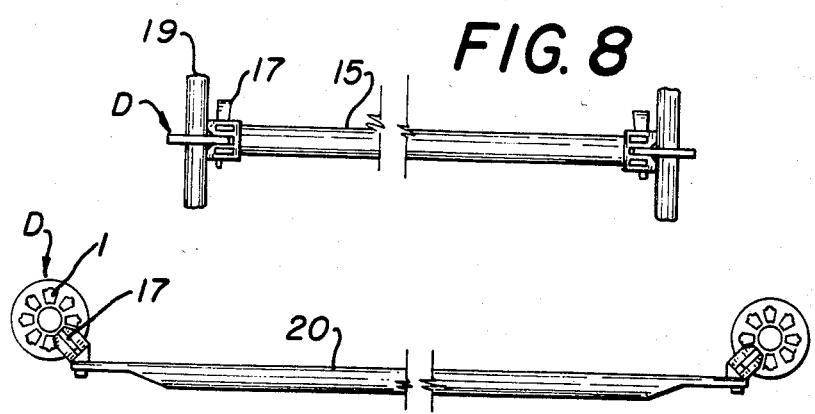
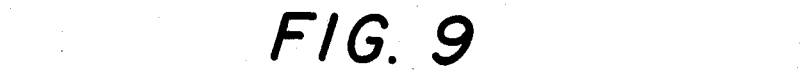

SCAFFOLDING AND LOCKING DISCS THEREFOR

BACKGROUND OF THE INVENTION

The invention relates to scaffolding and to the general type of scaffolding forming the subject of U.S. Pat. No. 4,044,523 which issued under the title of "Frame Structure, Particularly Scaffolding" to Eberhard Layher on Aug. 30th 1977, it being understood that no equivalent Canadian Patent exists.

Layher shows that it is known to provide a scaffold which includes a plurality of vertical supports and horizontal and angled crossbraces all of which interlock with what are termed as "ring flanges", having various cut-outs, fast on the vertical supports. These cut-outs are alternately larger and smaller and are differently shaped and dimensioned. The reason for this is so that the smaller cut-outs can accommodate the ends of horizontal braces which extend normal to the vertical axes of the vertical supports. The ends of angled or diagonal crossbraces, which may extend downwardly or upwardly at an angle to said vertical axes, may also be accommodated in the smaller cut-outs, the entire scaffolding structure thereby assuming a generally square or generally rectangular shape forming a scaffolding tower. This might be called "condition A". On the other hand, the purpose of the larger cut-outs is to accommodate, at various angles to one another, the ends of horizontal braces which may extend normal to the vertical axes of the vertical supports and/or the ends of diagonal crossbraces which may extend downwardly or upwardly at an angle to said vertical axes, the entire scaffolding structure thereby assuming a generally arcuate shape to form scaffolding surrounding a generally arcuate or circular building structure; this might be called "condition B".

The said ends of the horizontal and crossbraces are locked in their operative relationship with the vertical supports by means of pivoted wedge members which engage an inner surface of an aperture in the end of the horizontal or crossbrace and an inner surface of an associated cut-out regardless of either of the above conditions.

The smaller of the two types of cut-outs are barrel-shaped in plan view i.e. having arcuate sides and straight ends which extend parallel with the horizontal axes of the vertical supports. The larger of the two types of cut-outs have outwardly radially extending sides and circumferentially extending ends.

The main disadvantage with this type of arrangement is that, and as the above patent itself states "it must be assured that the respective oval cut-outs and the wider cut-outs in the superimposed ring flanges are in vertical registry with one another". Another disadvantage is the cost of fabricating the ring flanges in order to provide them with the different cut-outs.

Accordingly, it is the object of the present invention to overcome these disadvantages by providing the scaffolding with so-called "ring flanges" which do not have to rely upon two different types of cut-outs in order to bring about either condition "A" or condition "B".

SUMMARY OF THE INVENTION

According to one broad aspect, therefore the present invention relates to scaffolding including a plurality of substantially vertically extending and vertically adjustable support members; at least one locking disc secured to each vertical support, said disc having a plurality of radially extending locking apertures; each said locking aperture including a pair of spaced inner and outer surfaces joined together and spaced apart by a pair of spaced radially outwardly extending surfaces; each of said outer surfaces having a recess therein the radially outermost surface of which extends substantially tangentially to the remainder of its associated said outer surface and being connected to the latter by a pair of mutually opposed end surfaces; a plurality of brace members opposite ends of which each have a slot adapted to receive a portion of an associated said disc; and a locking wedge capable of pivoting in each said opposite end and capable of being driven substantially downwardly into said end and a selected said locking aperture to lock said end to said associated disc, each said wedge selectively engaging an associated said end of a brace member and said outer surface of a locking aperture.

According to another broad aspect, the invention relates to a locking disc for use in scaffolding of the type including a plurality of substantially vertically extending and vertically adjustable support members, a plurality of substantially horizonal brace members, a plurality of substantially diagonal crossbrace members and a locking wedge capable of pivoting in each end of each of said brace and crossbrace members and cooperating with a slot formed in each said end, at least one said locking disc being secured to each said support member, each said disc having a plurality of radially extending locking apertures; each said locking aperture including a pair of spaced inner and outer surfaces joined together and spaced apart by a pair of spaced radially extending surfaces; each of said outer surfaces having a recess therein the radially outermost surface of which extends at an angle of substantially 90° to a selected radius of the locking disc passing centrally through said recess, said outer surface being connected to the latter by a pair of mutually opposed end surfaces; a portion of each said disc being receivable in each said slot, each said locking wedge being capable of being driven substantially downwardly into its associated said end and a selected said locking aperture to lock said end to said associated disc, and each said wedge selectively engaging an associated said end of a brace member and said outer surface of a locking aperture.

BRIEF DESCRIPTION OF THE DRAWINGS

The invention is illustrated by way of example, in the accompanying drawing in which:

FIGS. 6 and 7 are part-sectional side views showing the cooperating between a brace and a locking disc in both conditions "A" and "B" respectively;

FIG. 8 is a side view of scaffolding members in condition "A";

FIG. 9 is a plan view of scaffolding members in condition "B"; and

DETAILED DESCRIPTION OF THE PREFERRED EMBODIMENT

Figure 1:
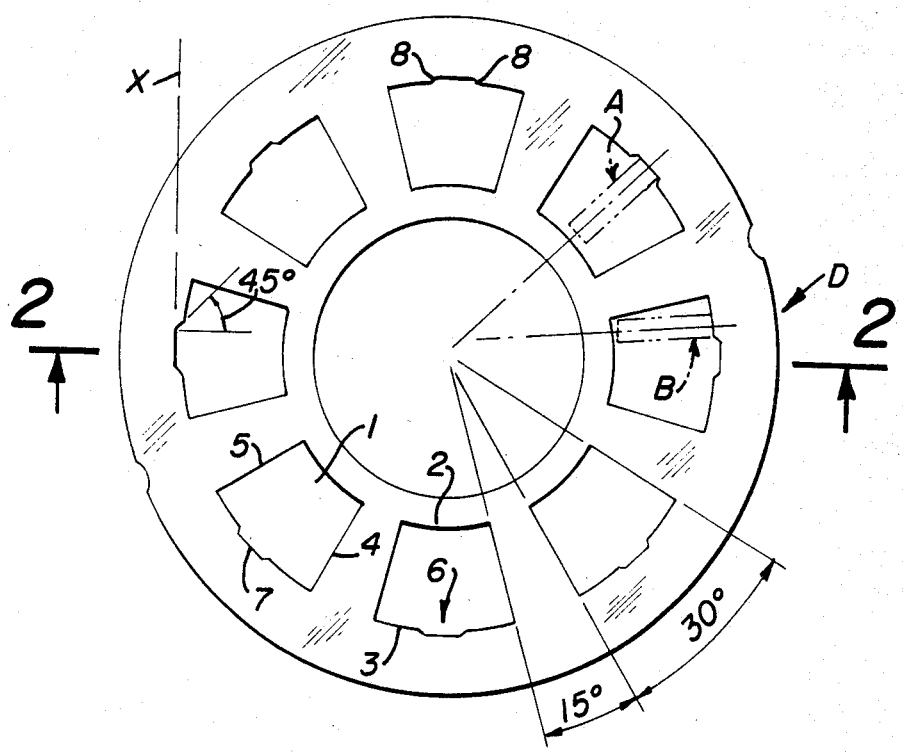
FIG. 1 is a plan view of the locking disc and FIG. 2 is a transverse cross-section thereof taken on the line 2—2 of FIG. 1.
Figure 2:
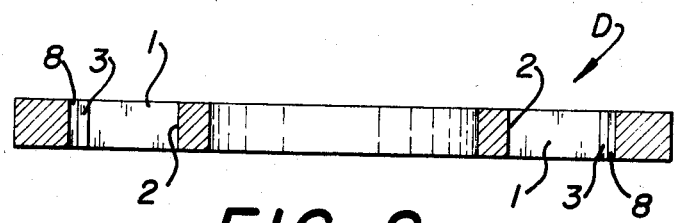

Referring to the drawings, and in particular to FIG. 1, a centrally bored circular locking disc, indicated generally at D, is provided with a plurality of radially extending locking apertures 1 therein, each of said locking apertures including a pair of spaced inner 2 and outer 3 surfaces joined together and spaced apart by a pair of spaced radially outwardly extending surfaces 4, 5. Each of the outer surfaces 3 is provided with a recess, indicated generally at 6, therein. The radially outermost surface 7 of each recess 6 extends substantially 90° (as indicated by line x) to a selected radius of the locking disc passing centrally through said recess, said remainder of its associated outer surface 3 being connected to the latter by means of a pair of angulated mutually opposed end faces 8 arranged at an angle of 45° to the associated surface 7. The surfaces 4, 5 of each locking aperture 1 define a 30° arc with the distance between a pair of adjacent such apertures 1 defining an arc of 15°

Figure 3:
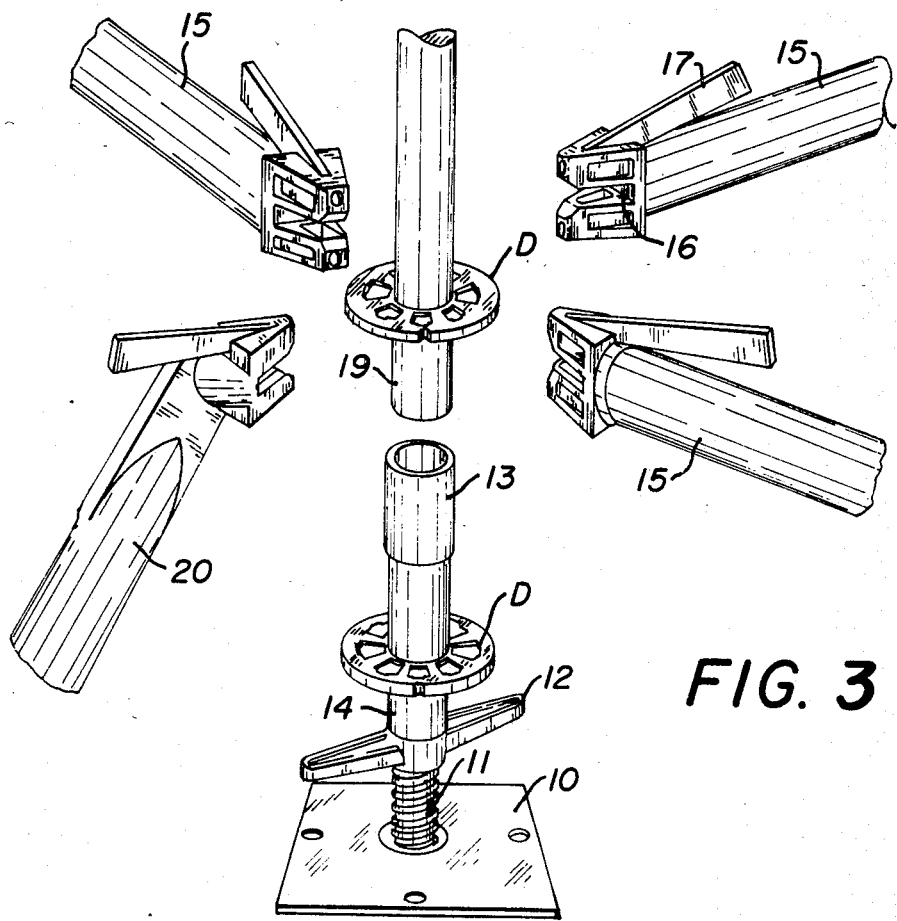
FIG. 3 is an exploded view of the various elements adapted to form a scaffold.
Figure 4:
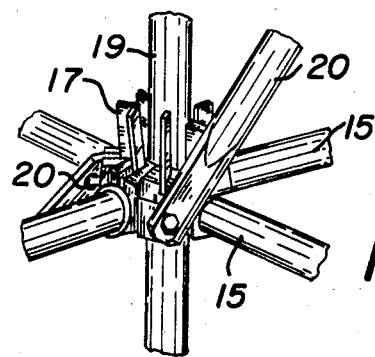
FIG. 4 is a side view of many of the scaffolding members of FIG. 3 shown in assembled form.
Figure 5:
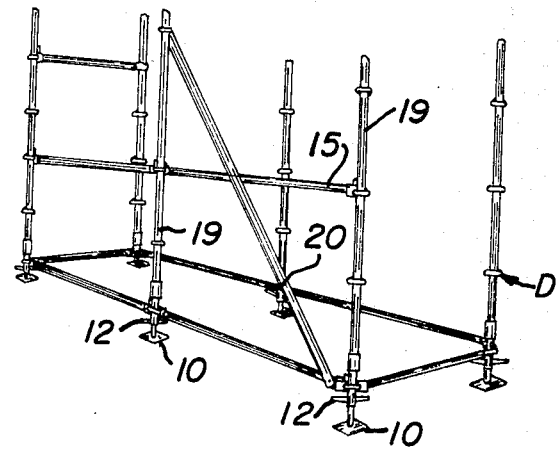
FIG. 5 is a perspective view of scaffolding members in condition "A"

A scaffold utilizing the locking discs D of the present invention is formed, see FIGS. 3 and 4 from a plurality of components which include a plurality of base-plates 10 each provided with a vertically extending threaded shank 11 receiving a cooperating adjustment nut 12 and a loosely mounted locking disc D provided with upper and lower spigots 13, 14 respectively loosely fitting over the shank 11, the lower spigot 14 being in surface engagement with the upper surface of the adjustment nut 12. A plurality of ledgers and/or transoms 15, opposite ends of which each have a slot 16, are also provided and each of these slots is adapted to receive a portion of a locking disc D as well as a locking wedge 17 capable of pivoting within slot 16 in each end of a ledger 15 and provided with a stud 9 inhibiting complete withdrawal therefrom.

Figure 6:
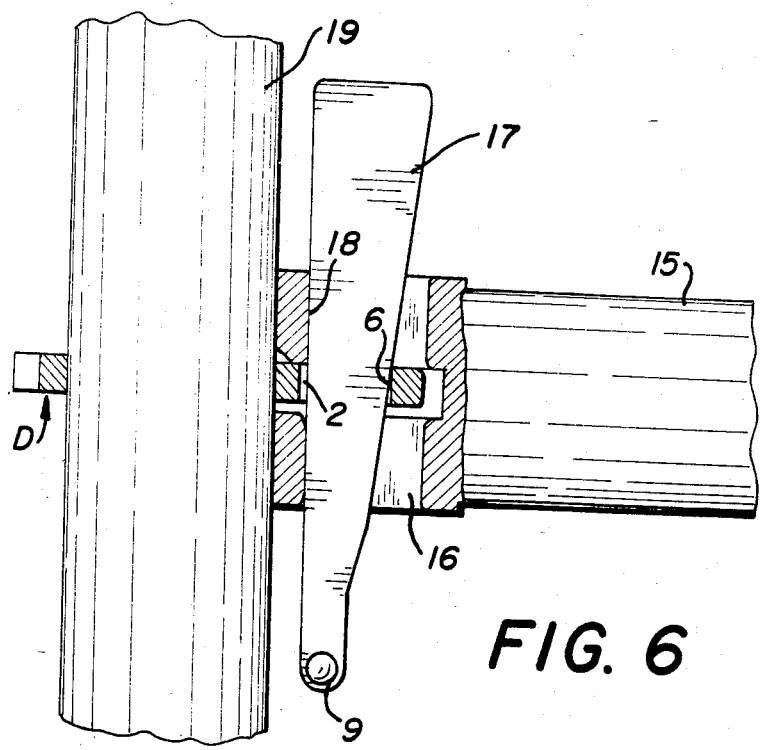

Dependent upon the purpose of the particular scaffold and whether, therefore, the latter is to suit condition "A" or condition "B", the end faces of each locking wedge 17 either contact an inner surface 18 of a slot 16 and the radially outermost surface 7 of the recess 6 of each locking aperture 1 of a locking disc D if condition "A" is contemplated and as is shown in FIG. 6 and indicated at "A" in FIG. 1 or, if condition "B" is contemplated, the said inner surface 18 and a mutually opposite surface 3 of a locking disc D as is shown in FIG. 7 and indicated at "B" in FIG. 1.

The lower ends of vertical standards 19 are then inserted into the upper spigots 13, each of such standards having a locking disc D mounted thereon. Ledgers 15 are again interlocked with the last-mentioned discs D so as to form the next level of the scaffold.

The scaffolding is also provided with a plurality of diagonal crossbraces 20, the ends of which are also formed with slots 16 and provided with pivotally mounted locking wedges 17 in the same way as the ledgers 15 and which crossbraces 20 are locked into engagement with a pair of upper and lower mutually opposed discs D. Successive stages of the scaffolding are then added in order to increase the height or overall width thereof.

The ends of the ledgers 15 may either be in axial alignment with said ledger and one another, as is shown in FIG. 8 or they may be angulated thereto as is shown in FIG. 9.

Figure 10:
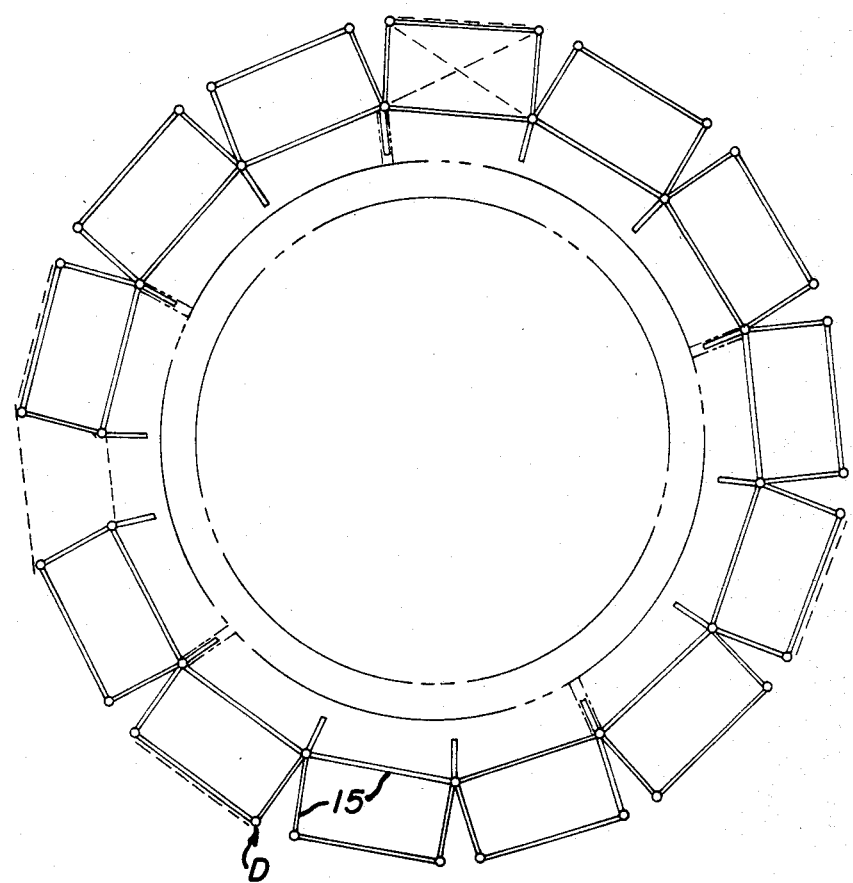
FIG. 10 is a diagrammatic plan view of scaffolding in condition "B".

FIG. 10 shows, in plan view, scaffolding formed by the present invention surrounding a generally arcuate tower and in condition "B".

It will be appreciated that by utilizing the present invention, it is only necessary to insure that the cut-outs of superimposed locking discs are in vertical registry with one another in order to form scaffolding of either condition "A" or that of condition "B" because all of the locking apertures 1 are identically shaped unlike those of the prior art and this is a distinct time-saving factor.

It will be understood that both ledgers 15 and crossbraces 20 mentioned herein are, generically "brace members".

Such scaffolding will, in known manner, accept and support decking, bridges, toe-boards, hop-up brackets, guard rails etc. usually associated with the scaffolding art.

The embodiments of the invention in which an exclusive property or privilege is claimed are defined as follows:

1. Scaffolding including a plurality of substantially vertically extending and vertically adjustable support members; at least one locking disc secured to each vertical support, said disc having a plurality of radially extending locking apertures; each said aperture being defined by a pair of spaced inner and outer surfaces of said disc joined together and spaced apart by a pair of spaced generally radially outwardly extending surfaces of said disc; each of said outer surfaces of said disc having a recess therein, the radially outermost surface of which extends at an angle of substantially 90° to a radius extending centrally through said outermost surface of the disc, said outer surface being connected to the radially outermost surface by a pair of mutually opposed end surfaces; a plurality of brace members opposite ends of which each have a slot adapted to receive a portion of an associated said disc; and a locking wedge capable of pivoting within each said opposite end and capable of being driven substantially downwardly into said end and a selected said locking aperture to lock said end to said associated disc, each said wedge selectively engaging an associated said end of a brace member and said outer surface of a locking aperture.

2. Scaffolding according to claim 1 wherein each of said mutually opposed end surfaces extends at an angle of 45° to the associated radially outermost surface.

3. Scaffolding according to claim 2 wherein each said pair of spaced radially outwardly extending surfaces define a 30° arc with the distance between an adjacent pair of said apertures defining an arc of 15°.

4. Scaffolding according to claim 1 wherein each said pair of spaced radially outwardly extending surfaces define a 30° arc with the distance between an adjacent pair of said apertures defining an arc of 15°.

5. A locking disc for use in scaffolding of generally rectangular shape and for use in scaffolding of generally arcuate shape said disc having a generally centrally disposed aperture and a plurality of radially extending locking apertures disposed radially outwardly from the central aperture; each said locking aperture being defined by a pair of spaced inner and outer surfaces of said disc joined together and spaced apart by a pair of spaced apart and radially outwardly extending surfaces; each of said outer surfaces of said disc having an outwardly extending recess therein the radially outermost surface of which extends at an angle of substantially 90° to a radius of the locking disc extending generally centrally through said outer surface, said outer surface being connected to the radially outermost surface by a pair of mutually opposed end surfaces whereby the recess of each said locking aperture enables the secure locking of the scaffolding into a generally rectangular shape and whereby the outer surface of each said locking aperture enables the secure locking of the scaffolding into a generally arcuate shape.

6. A locking disc according to claim 5 wherein each of said mutually opposed end surfaces extends at an angle of 45° to the associated radially outermost surfaces.

7. A locking disc according to claim 6 wherein each said pair of spaced radially outwardly extending surfaces define a 30° arc with the distance between an adjacent pair of said apertures defining an arc of 15°.

8. A locking disc according to claim 5 wherein each said pair of spaced radially outwardly extending surfaces define a 30° arc with the distance between an adjacent pair of said apertures defining an arc of 15°.

* * * * *